United States Patent [19]
Ruben

[11] Patent Number: 5,473,979
[45] Date of Patent: Dec. 12, 1995

[54] FOOD SMOKING COOKER

[76] Inventor: Raymond R. Ruben, 293 N. Santa Clara, New Braunfels, Tex. 78130

[21] Appl. No.: 259,358

[22] Filed: Jun. 13, 1994

Related U.S. Application Data

[63] Continuation of Ser. No. 985,135, Nov. 30, 1992, abandoned.

[51] Int. Cl.[6] .................................................. A47J 37/07
[52] U.S. Cl. ............................ 99/446; 99/340; 99/448; 99/482; 126/25 R; 49/171
[58] Field of Search ......................... 134/113; 49/171; 99/340, 341, 444, 446, 448, 449, 450, 482, 400, 447; 126/25 R, 190, 273 R

[56] References Cited

U.S. PATENT DOCUMENTS

| | | | |
|---|---|---|---|
| 928,900 | 7/1909 | Brand | 99/482 |
| 1,302,682 | 3/1919 | Legg | 99/480 |
| 1,477,844 | 12/1923 | Nystrom | 126/190 |
| 1,632,719 | 6/1927 | White | 99/449 |
| 2,608,190 | 8/1952 | Winning | 126/25 R |
| 2,611,357 | 9/1952 | Turner | 126/25 R |
| 2,812,706 | 11/1957 | DelFrancia | 99/446 |
| 2,833,201 | 3/1958 | Simank | 99/482 |
| 3,016,816 | 1/1962 | Persinger | 99/446 |
| 3,045,582 | 7/1962 | Wells | 99/340 |
| 3,049,071 | 8/1962 | Diack | 99/446 |
| 3,217,634 | 11/1965 | Fox | 99/446 |
| 3,863,619 | 2/1975 | Wolf | 49/171 |
| 3,974,760 | 8/1976 | Ellis | 99/448 |
| 4,598,693 | 7/1986 | Koziol | 99/341 |
| 4,763,444 | 8/1988 | Ritchie | 49/171 |
| 4,773,319 | 9/1988 | Holland | 99/446 |
| 4,862,792 | 9/1989 | Lerma | 99/448 |
| 5,078,049 | 1/1992 | Glanton | 99/340 |
| 5,090,398 | 2/1992 | Raymer | 99/449 |
| 5,184,599 | 2/1993 | Stuart | 99/467 |

FOREIGN PATENT DOCUMENTS 2036885  1/1983  Germany ................. 126/273 R

*Primary Examiner*—Timothy F. Simone
*Assistant Examiner*—Terrence R. Till

[57] ABSTRACT

A vertical hollow enclosed main member with hinged access doors. Grill shelves made of intermittent rod members are attached in an internal arrangement for holding food, especially meat for cooking using charcoal or wood for fuel. The internal hollow area of the main member is divided by a manually adjustable partition member to provide precise controlled indirect heat and smoke. The partition also diverts rendered waste from being reburned therefore enhancing the quality of food produced.

9 Claims, 7 Drawing Sheets

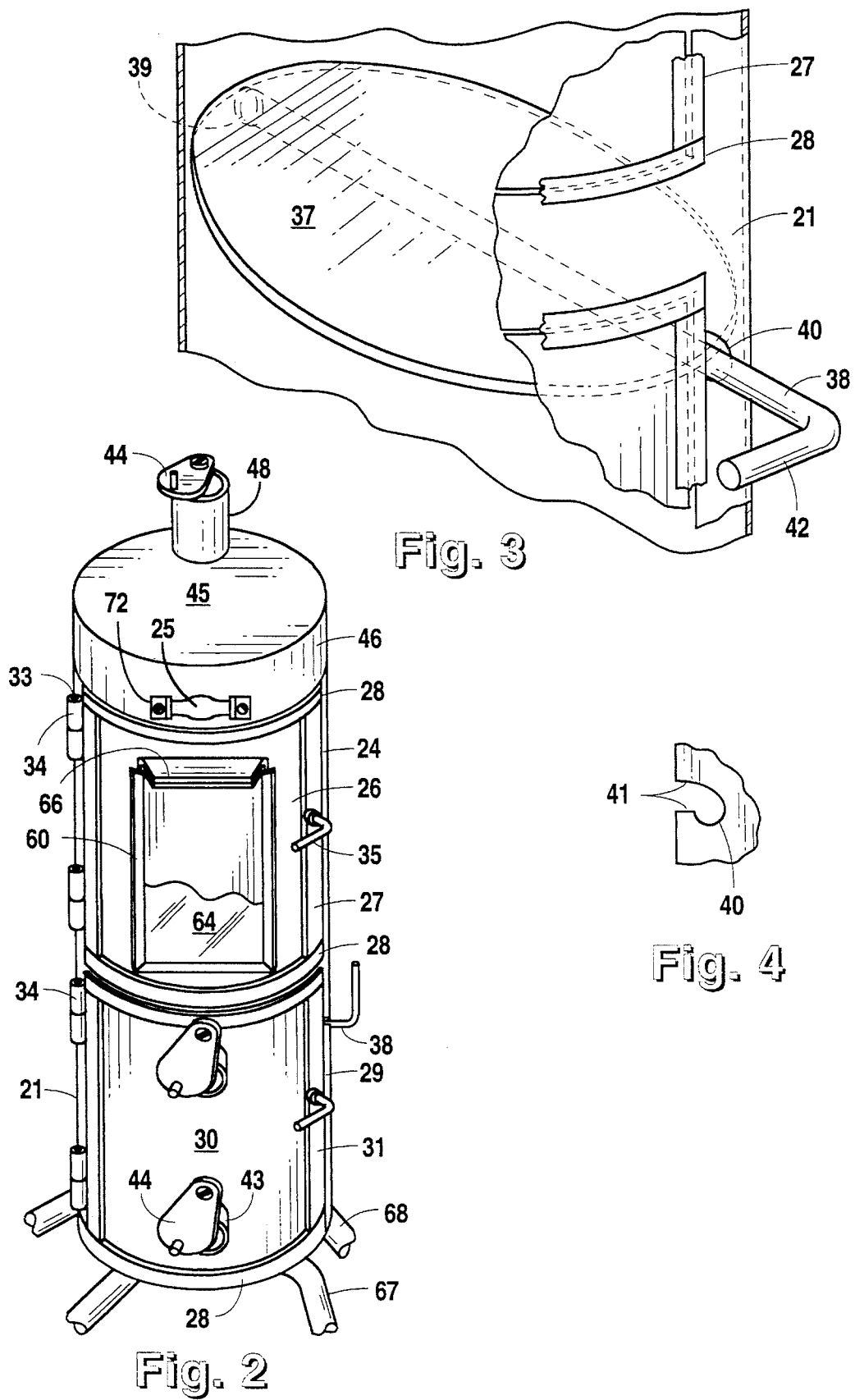

FOOD SMOKING COOKER

This application is a continuation of application Ser. No. 07/985,135, filed Nov. 30, 1992, now abandoned.

BACKGROUND—FIELD OF INVENTION

The present invention relates to a food smoking type cooker. More specifically the present invention relates to smoke cooking meat using charcoal or wood for the benefit of smoke flavoring.

BACKGROUND—DESCRIPTION OF PRIOR ART

Devices available are of a variation of design. A simple pan with wire grate grill to large high volume bulky heavy static and mobile units mounted on wheels and tables.

There are two basic types of cookers. The type where the product is placed directly above the fire or hot coals, some designs are open others are covered. The other type is where the firebox compartment is isolated or partitioned from the cooking compartment, using indirect heat.

The disadvantage of the type where the product is cooked directly above the heat is uneven or inconsistent cooking. It requires constant attention and tending to produce acceptable results. Also renderings fall directly into the fire causing flame up and erratic combustion. This reburning also produces hydrocarbons containing carcinogens. A further severe disadvantage in this type is cleaning. The hot renderings mix with hot ashes causing an undesirable tar like residue.

The disadvantage of the type where the fire box compartment is partitioned off is accessibility to tending the product and controlling the heat. The tending involves raising doors with the heat and smoke severely contacting the operator's upper body and face especially smoke in the eyes. This design is of a horizontal configuration which occupies excessive space and is awkward to move about. The cost of fabrication of the fire box compartment involves considerable fit-up and welding. The present invention eliminates a separate firebox as it is integral with the main member.

Objects and Advantages

Accordingly, besides the objects and advantages of the smoke cooking device described in my above patent, several objects and advantages of the present invention are:

(a) To provide a cooking device with precise heat control which is very important as great pride is taken in smoking meat.

(b) To provide easy access to the interior for handling food and cleaning the firebox on opening the door the food may be quickly rotated away from the heat and smoke. Also the firebox is wide open for easy quick removal of ashes.

(c) To provide a cooking device which is mobile and compact relative to its capacity.

(d) To provide a cooking device which is versatile in application; for example one or two fireboxes maybe used simultaneously, or the whole internal area may be adapted to be used for a direct cooking situation.

(e) To provide a cooking device which uses natural elements to function, and conserve fuel materials. Packaged charcoal is $1.69 of hickory chips is $1.16 per small bag. As an example it takes 25 lbs. of wood and charcoal to cook a medium 17 pound turkey for six to eight hours of necessary cooking time.

(f) To provide a cooking device which cost less to fabricate by eliminating the separate firebox and the design uses an integral oven and grill, this is relative to cookers of the same utility class and price range.

(g) To provide a cooking device with an efficient waste elimination system to prevent unhealthy reburning of the renderings.

To summarize; the ultimate objective is to provide a quality cooking device which has been thoroughly thought out to furnish every convenience with ease for the unskilled and skilled operator. Still further advantages will become apparent as this item is used by the public, Although the description above contains many specificities, these should not be construed as limiting the scope of the invention but as merely providing illustrations of the presently preferred embodiments of this invention. For example, the device can vary size and capacity to be consistent with a wide range of requirements.

Thus the scope of the invention should be determined by the appended claims and their legal equivalents, rather than by the examples given.

DESCRIPTION OF THE DRAWINGS

FIG. 2 is a frontal view showing the doors closed and exterior details.

FIG. 3 is fragmentary perspectives showing details of the adjustable partition.

FIG. 4 is a fragmentary side view showing detail of the lead-in notch.

DESCRIPTION—FIG. 1–8

Figure 1:
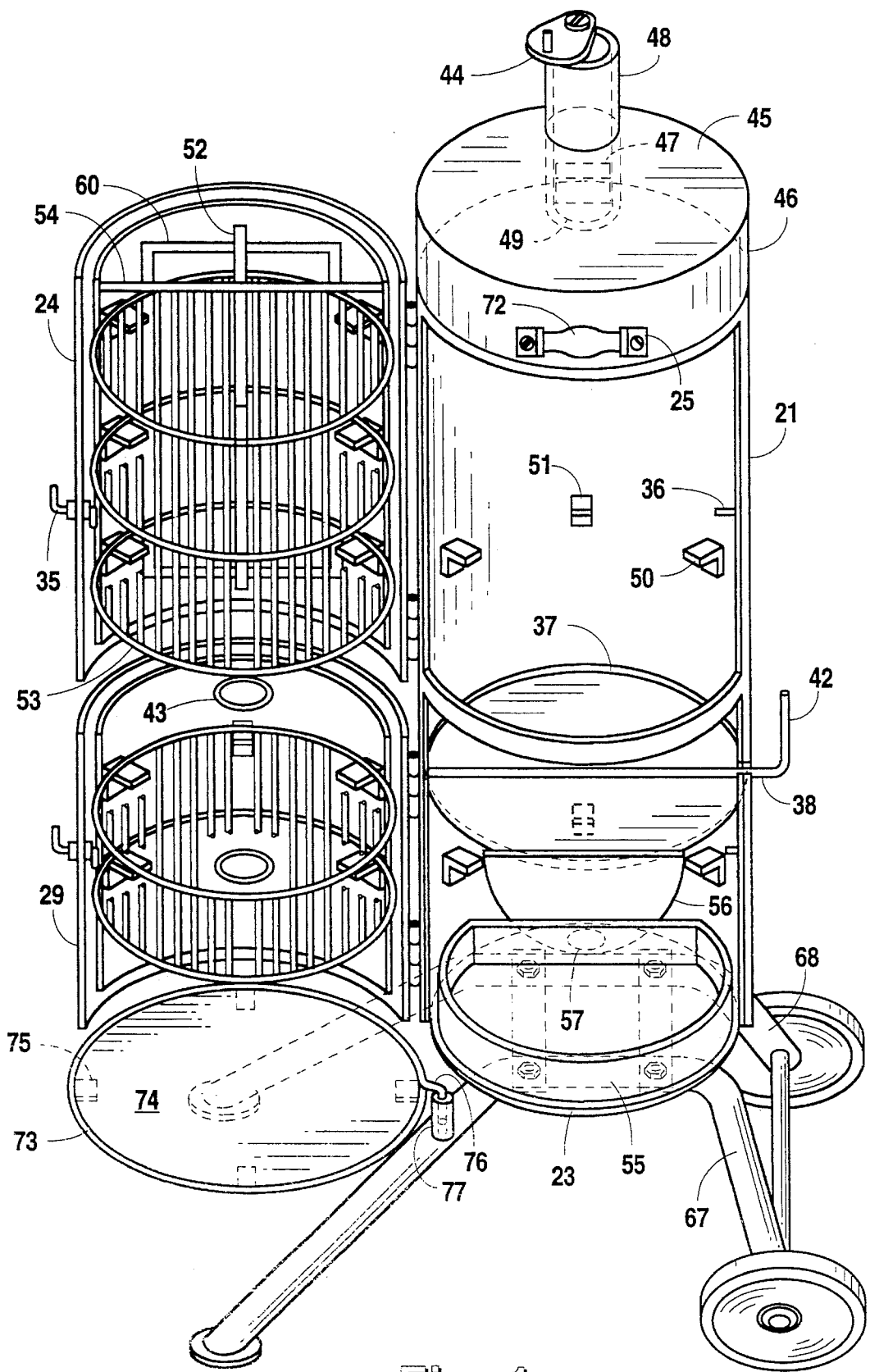
FIG. 1 is a frontal view showing in detail the interior with the compartment doors open in a position for placing food.

As shown in the drawings the preferred smoke cooking device in accordance with the present invention includes a vertical hollow housing 21 of cylindrical cross section divided by an adjustable partition plate 37, to form upper and lower chambers.

The housing 21 is enclosed at the ends by a top closure panel member 22 and a bottom closure panel member 23. An upper closure door 24 encloses the upper chamber. The closure door 24 consist of a curved sidewall member 26 cut out from the housing 21 sidewall with former members 27 and 28 around the periphery. The lower chamber is enclosed by a lower closure door 29 consisting of a curved sidewall 30, also cut out from the housing 21 sidewall, with former members 31 and 32 attached around the periphery.

Another feature of the upper door 24 is a shielded window opening. As shown in the drawings FIG. 5, a mounting bracket 60 is attached in the housing 21 sidewall opening. Guide members 61 retain an inter shield member 62 an outer shield member 63 with a glass member 64 contained between. The shield members 62 and 63 have bent tab portions 65 for the outer shield 63, and 66 for the inter shield 62.

A further feature of the upper door is a transverse bar member 54 attached to the upper diametrically opposite upper corners of the upper door sidewall 26.

The upper door assembly 24 and lower closure door 29 are attached to the housing 21 by a plurality of hinge joints. Each hinge joint consist of a pivot rod member 33 inserted through end to end axial aligned hollow pipe members 34. At each joint an upper pipe member 34 is attached to the door assembly upper 24 and lower 29, a lower pipe member 34 is attached to the housing 21, this arrangement allows the doors to be removable.

The internal hollow area of the housing 21 is divided by a circular adjustable partition plate 37. A pivot rod plate 38 with an extended portion 42 bent 90 degrees is attached on the lower side at the partition plate 38 diametrical centerline. The partition plate 37 is located at the approximate quarter span from the housing 21 lower end. As shown in FIG. 3, a register hole 39 through the housing 21 side wall is aligned with a diametrical opposite hole 40, alter by a lead-in notch 41.

A feature of the lower closure door 29 includes a plurality of duct members 43, mounted through the lower door panel member 30. An attached rotatable plate member 44 is mounted by a headed rivet attached by a angle bracket to the duct member 43 outer wall.

The housing 21 is enclosed by hinged upper door assembly 24 and lower closure 29. The door assemblies 24 and 29 may be secured in a closed position by a rotatable round bar member 3! 5. One end portion of the bar member 35 forms a hook when rotated using the opposite end formed handle, engages a protruding round pin 36 fixed, in a compatible location on the inter wall of the main member 21, to receive the hooked portion of bar member 35. The bar member 35 is installed through in line holes through, the door open edge side, peripherial formers 27 and 30 and upper panel member 26 and lower panel member 30.

Figure 5:
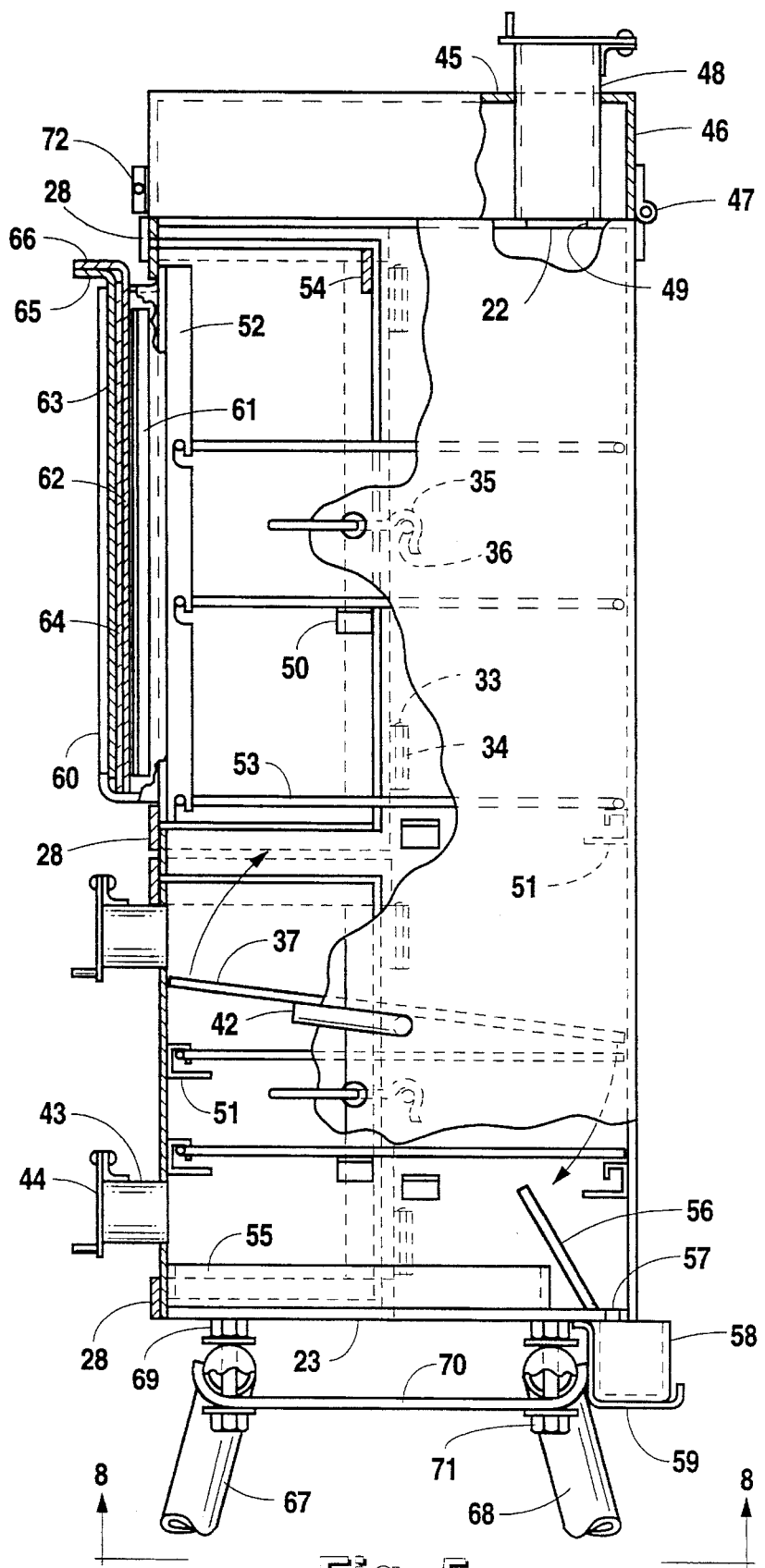
FIG. 5 is a side elevation view with cut away sectioning to show interior detail.

As shown in FIG. 5, mounted above and isolated from the upper chamber is an area covered by a canopy, movable by a bracket 25 mounted bar 72. A circular flat closure panel 45 and a circular sidewall ring 46, is attached to the main member by a conventional hinge member 47 at the rear. The air vent stack member 48 is mounted through the top closure panel 45. When the canopy is closed the vent stack member 48 is aligned with an opening 49 and fits flush against the top closure panel 22.

Figure 6:
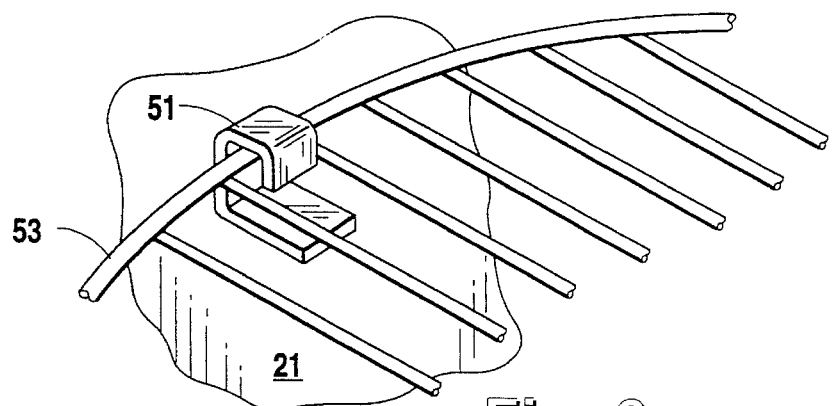
FIG. 6 is a fragmentary cutaway internal view of the device of FIG. 1 showing detail of the grill retaining bracket.
Figure 7:
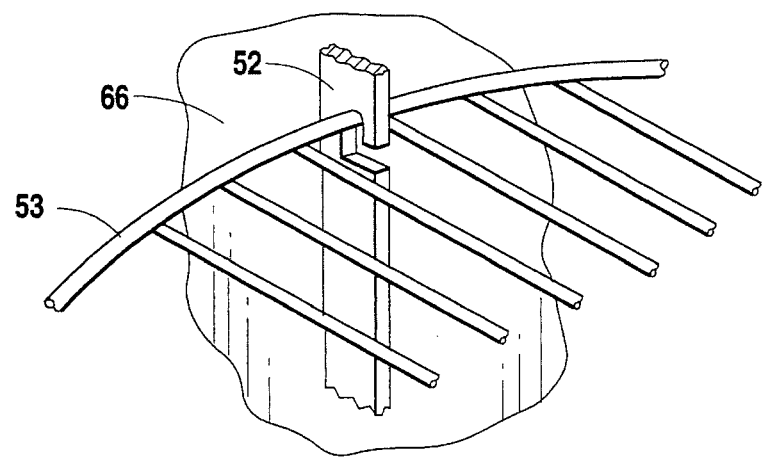
FIG. 7 is a fragmentary cutaway internal view of the device of FIG. 1 showing detail of the grill retaining bar bracket.
Figure 8:
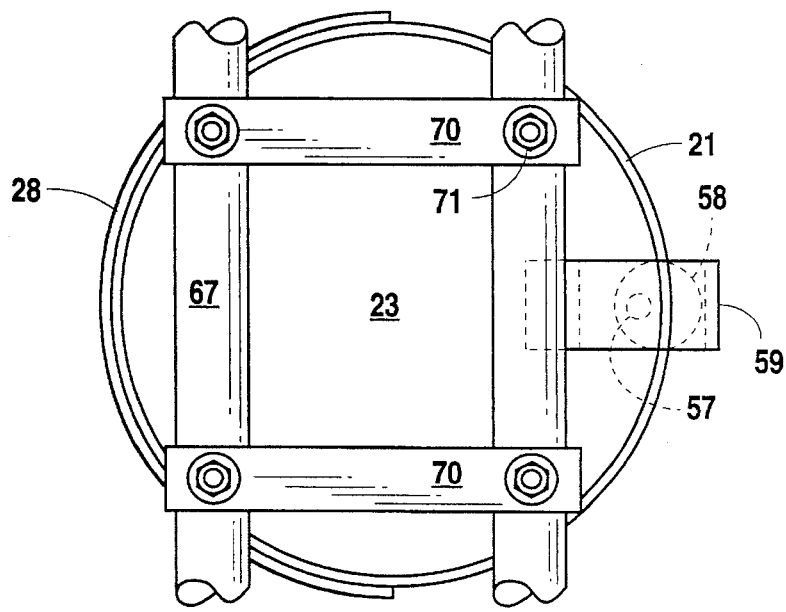
FIG. 8 is a straight projection orthographic view of the bottom end of the device in FIG. 5.

Grill members 53 constructed of rim members with straight wire cross members are supported on bracket members 50, mounted on the inner surface of the door sidewall 26 and 30. The center bracket members 51 in the lower chamber is of different profile than the outer right and left hand bracket members 50. The center bracket member 51, as shown in the drawings FIG. 6, and center bar bracket member 52, as shown in the drawings FIG. 7 provide a hook to fit grill member 53, outer rim.

As shown in the drawings FIG. 1 and FIG. 5, a partition member 56 is attached to the housing 21 interwall at the intersection with the bottom closure panel 23. The area partitioned off, further has an opening 57 through the bottom closure panel 23, which provides an outlet into the container 58, which is supported by a bracket 59.

As shown in the drawings in FIG. 5, formed tubular leg member 67 and opposite 68, in conjunction with cross members 70 are bolted to the underside of bottom closure panel 23. Standard nuts 69 fixed to the underside of lower plate 23 provide attachment, for the leg member 67 and 68, by installation of standard bolts 71.

As shown in the drawings FIG. 1, a flat insert 74 preferably of plastic is supported by a plurality of cantilever brackets 75. The cantilever brackets 75 are further attached equally spaced to a framing bracket 73.

A receptacle pipe member 77 attached to the support leg member 67 provides a pivot joint with the bent elbow 76 of the framing bracket 73 inserted.

Also shown in FIG. 1 is a predominately circular, except for a flat portion, shaped ring member 55, mounted unfixed on the upper surface of the bottom closure panel 23.

OPERATION—FIGS. 1, 2, 3, 4, 5, 6, 7, 8

The manner of using the present smoke cooking device is objectively typical for cookers in present use. The food, particularly meat is supported on intermittent rod grill members or hung, with heat applied directly, such as for steaks, and preferably indirectly for smoke cooking of pork and fowl.

The vertical arrangement of the hollow housing 21 is to take advantage of natural functions since heat rises and the cooking compartment is directly above the heat source the arrangement allows maximum efficiency from the fuel and therefore conservation of materials. Also using the natural element of gravity, effecting the free fall of rendered waste, being used in an efficient waste elimination system.

The hollow housing 21 with the door assembly 24 and 29 closed provide an enclosed area for food placed on door mounted grill members 53 to be cooked.

The hollow internal area of the housing is divided by an adjustable partition plate 37 into a lower firebox, limited cooking, compartment and an upper smoke cooking compartment. The adjustable partition 37 is attached to the housing 21 by a pivot rod plate 38; with a portion of one end extending to form a hand grip handle 42. The pivot rod member 38 with the partition plate 37 attached is installed in the housing 21; by inserting the end, opposite the handle end, into a register hole 39, then inserting the handle end through a lead-in notch 41 into an aligned diametrically opposite hole 40. In this position the adjustable partition 37 maybe manually rotated using the handle 42, within an approximate angle of forty five degrees as shown in the drawings FIG. 5. The closed position allows no opening between the upper and lower chambers, with the partition 37 at an incline of approximately ten degrees. The open position which allows heat to transfer between the chambers may be adjusted, by operator discretion, to a maximum, stopped by the fixed partition plate 56.

The fixed partition member 56 provides an intermediate surface, to flow rendered waste diverted by the upper surface of the adjustable partition plate 37, into the drain opening 57. The waste is then accumulated in the dispensing container 58, held by the bracket 59.

The housing 21 including all attachments is bolted to support structure by standard bolts 71. As shown in FIG. 5, standard nuts are welded to the bottom of the lower plate 23. Bolts 71 are inserted through matched holes in the tubular support leg member 67 and opposite support member 68. Note: Members 67 and 68 are not identical parts because of the angular set and hole pattern. Flat stock crossmembers 70 provide rigidity in a transverse direction.

Types of meat such as long slabs! of pork ribs, whole hams or large fowl such as turkeys maybe hung on a bar member 54 located and attached to the diametrically opposite upper end corners of the inter upper door sidewall 26. Door mounted grill members 53 provide a highly accessible and comfortable operator tending convenience. The doors 24 and 29 may be rotated transporting the food in and out of the chambers. This allows the operator to position away from the heat and smoke while tending the food. The grill members 53 being easily removable provide flexible arrangement considering spacing due to variation of meat sizes. Grill members 53 are installed by resting on a plurality of simple angle brackets 50 attached, one to the right and one on the left, to the inter surface of the upper door panel 26 and lower door sidewall 30. With the grill member 53 on the brackets 50 then pushing inwardly, slightly upward tilting the near portion of the grill rim the far portion of rim will contact the grill retaining bar member 52. As is easily visible, the far grill rim portion will engage a lead-in notched opening formed in the retaining bar 52. Then by lowering the grill rim portion held by the operator the far grill rim portion will be secured by the "hooking" feature of the bar member 52. As shown in the drawings FIG. 7, applies to installing grill member in the upper chamber. To install grill members 53 in the lower chamber the same procedure is followed; except in the place of the grill retaining bar 52 a lead-in bracket 51 with a return bend portion forming the "hooking" feature is used.

Several optional accessory features for convenience are provided by the present cooking device. A warming compartment covered by a canopy is located above the upper chamber. The canopy consist of a hinge member 47 attaching the circular ring member 46 to the housing 21. The compartment is enclosed at the end by a circular plate 45 with the vent stack member 48 an integral part. The canopy maybe open or closed by a handle 72 fixed by brackets 25.

Inspection of the food with the door closed may be accomplished by a shielded glass member 64. An inter shield member 62 protects the glass 64 from smoke and residue. An outer shield 63 protects the glass 64 externally and operator safety. To observe through the glass 64 simply push up on the underside of the shield member 63 bent tab handle 65 which also raises shield member 66. The glass 64 is unattached and will remain in place.

Charcoal and wood pieces are held in place by a loose containing ring member 55. It may be freely positioned on the upper surface of the bottom closure panel 23 or on the upper surface of the adjustable partition 37. Or if necessary both locations may be used for fireboxes at the same time. As an example, when grilling steaks or beef patties or food close to the fire not requiring prolonged smoke cooking additional grill capacity may be required. In this cooking situation it is not required that the doors be closed. Further to adapt the grill members 53 to be used with the doors open a set of grill support brackets 50 and 51 are fixed to the housing 21 inter side wall, as shown in the drawings FIG. 5. This option pertains only to the lower grill member 53 in the lower chamber and the lower grill member 53 in the upper compartment.

For food handling work surface exterior of the inter chamber a movable circular frame with a loose insert 74, is supported by a plurality of cantilevered brackets 75. This work surface is designed to pivot by an extended portion forming a right angle elbow 76 which is inserted into a round pipe member 77 fixed to a support leg of the support structure. The work surface maybe pivoted in a circular path as convenience requires. As shown in the drawings FIG. 9 a smoke cooking device in accordance with the present invention includes a vertical hollow main member 80 of square or rectangular cross section made preferable of sheet metal. The main member 80 is hollow to allow an internal area for holding food specifically meat while being cooked, utilizing smoke for flavoring.

The main member 80 is enclosed at the upper end by a plate member 81, and at the lower end by a plate member 82. To enclose the cooking compartment an upper door assembly 83 consists of a divided panel member 84 with heavy gage formering members 85 and 86 around the periphery. To enclose the fire box combination; cooking compartment, a lower door assembly 87 consist of a panel member 88 and heavy gage forming members 89 and 90 around the periphery. To enhance structural strength a sheet metal support beam member 91 is attached to and spans between the formed inner edges of the main member 80 also it complete the upper door assembly 83 and lower door assembly 87 openings. The upper door assembly 83 and lower door assembly 87 are attached to the main member 80 by short pipe members 92 aligned by an axial pin member 93. At each hinge joint one pipe member 92 is attached to the main member 80 and one attached to the corresponding door; being held together by the axial pin member 93 to complete the hinge joint. The door assembly 83 and 87, when closed are secured by a pivot latch member 94 which rotates engaging a notched receiving member 95.

The internal area of the main member 80 is divided by an adjustable partition member 96 located at approximately the quarter span of the length of the main member 80 from the lower plate member 82. A pivot rod member 97 is attached to the underside of the partition member 96. The pivot rod member 97 attaches the partition member 96 to the main member 80 by insertion into diametrically opposite holes 98 provided in the main member 80 side walls. The right hand exterior portion of the pivot rod member 97 is bent at a right angle, oriented in the same plane as the partition member 96 to form a handle member 99.

Food handling channel grill guide members 100 and 101 are attached to the inside walls of the main member 80. The length of the guide members 102 and 103 and 104 and 105 are shortened in the lower fire box cooking compartment to facilitate other structures.

Figure 10:
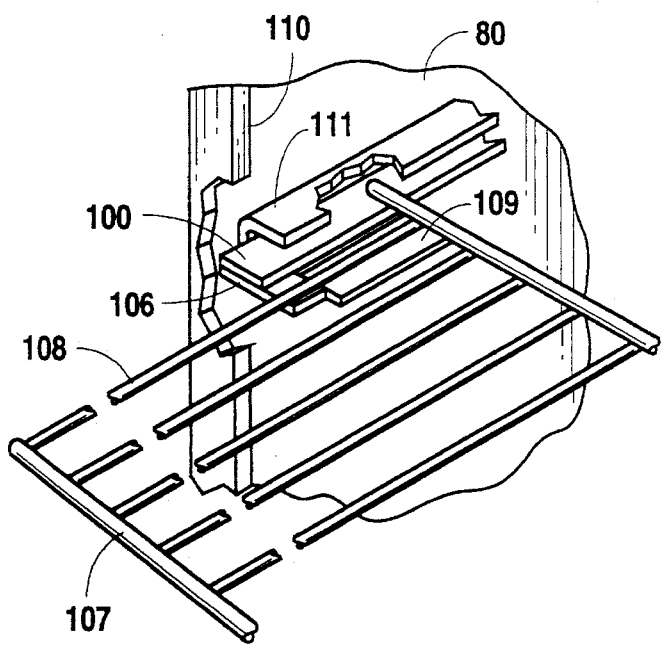
FIG. 10 is an internal fragmentary cutaway perspective view showing details of the grill stops.

As shown in the drawings in FIG. 10, are details of the channel grill guide member 100 and grill stop member 106. It is necessary to be able to move the grill member 107 in and out for food inspection during cooking and completely out for cleaning. This is accomplished by an extension of the grill rear cross member 108 engaging the grill channel guide member 100 in conjunction with the grill side member 108.

As the grill side member 108 travels in and out it is supported by the grill stop member cantilevered out from the bottom flange of the grill guide member 100. When the grill member 107 is fully extended the spacing bar member 109 attached to the underside of the grill side member 100 engages the grill stop member 106. This limits the outward travel of the grill member 107 from the cooking compartment. To prevent mishandling food it is necessary to limit the outward travel of the grill member 107. If extended too far and loaded with food the grill could pivot downward dropping food on the ground.

To remove the grill member 107 completely, the near end of the grill member 107 is elevated. This motion disengages the spacing bar member 109 from the grill stop member 106 then it becomes a simple motion of pulling the grill member 109 further out so the extended end of the rear grill cross member 108 comes in contact with the inside stiffening flange member 10 of the main member 80. By a rotation of the grill member 107 the extended end 108 disengages from the slide member 100 through a relief notch 111 at the end of the slide member 100. The grill 107 now in a side tilted position to be lifted out the door opening. To replace the grill member 107 into the cooking compartment the removing procedure is reversed as follows; insert the extended end of the grill cross member 108 back inside the door opening beyond the stiffening flange 110. With the grill at a side tilt angle place the extended end of the grill rear cross member 108 through the relief notch 111, rotate the opposite grill end into the opposite grill guide notched end, with the grill level, by pushing inwardly the grill member 107 will follow the guide member 100 and 101 into position.

Figure 11:
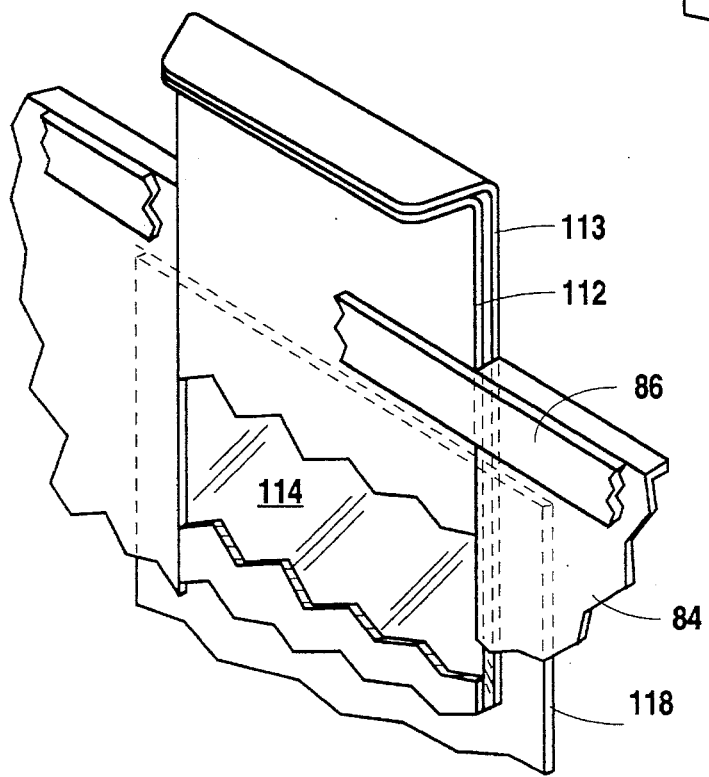
FIG. 11 is an external fragmentary cutaway perspective view showing detail of the view window of the device in FIG. 9.
Figure 14:
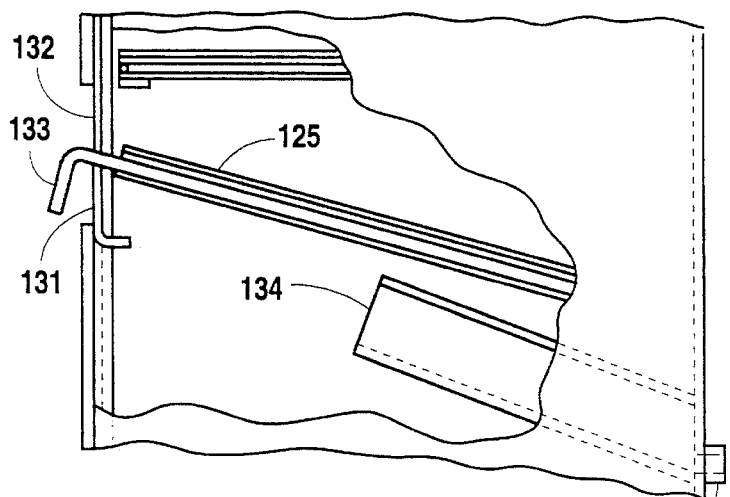
FIG. 14 is a fragmentary view of the side elevation of the device in FIG. 13.

As shown in the drawings in FIG. 11 an observation area for interior viewing consisting of an adjustable outer shield member 112 and an adjustable inner shield member 113 held in place by a retaining member 118. The observation area permits instantaneous visual inspection of the food without having to open the cooking compartment door member 83. The inner shield member 113 prevents the glass pane member 114 from being subjected to smoke and rendered residue. The outer shield member 112 is to protect the glass member 114 from a cold liquid spill or an object breaking the glass.

Figure 12:
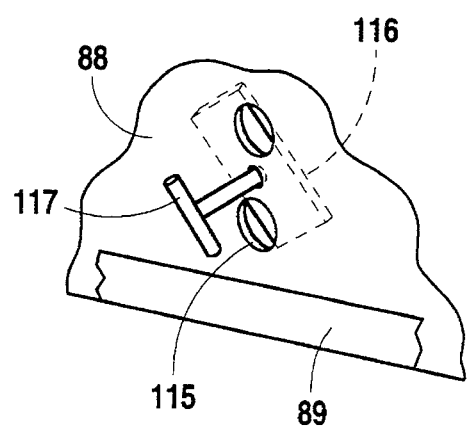
FIG. 12 is an external fragmentary cutaway perspective view showing detail of the air inlet valve of the device in FIG. 9.

As shown in the drawings in FIG. 12, is a variable air inlet valve consisting of openings 115 and a rotating inner bar member 116 with an attached "T" handle member 117 for adjusting the area of the openings 115.

Figure 13:
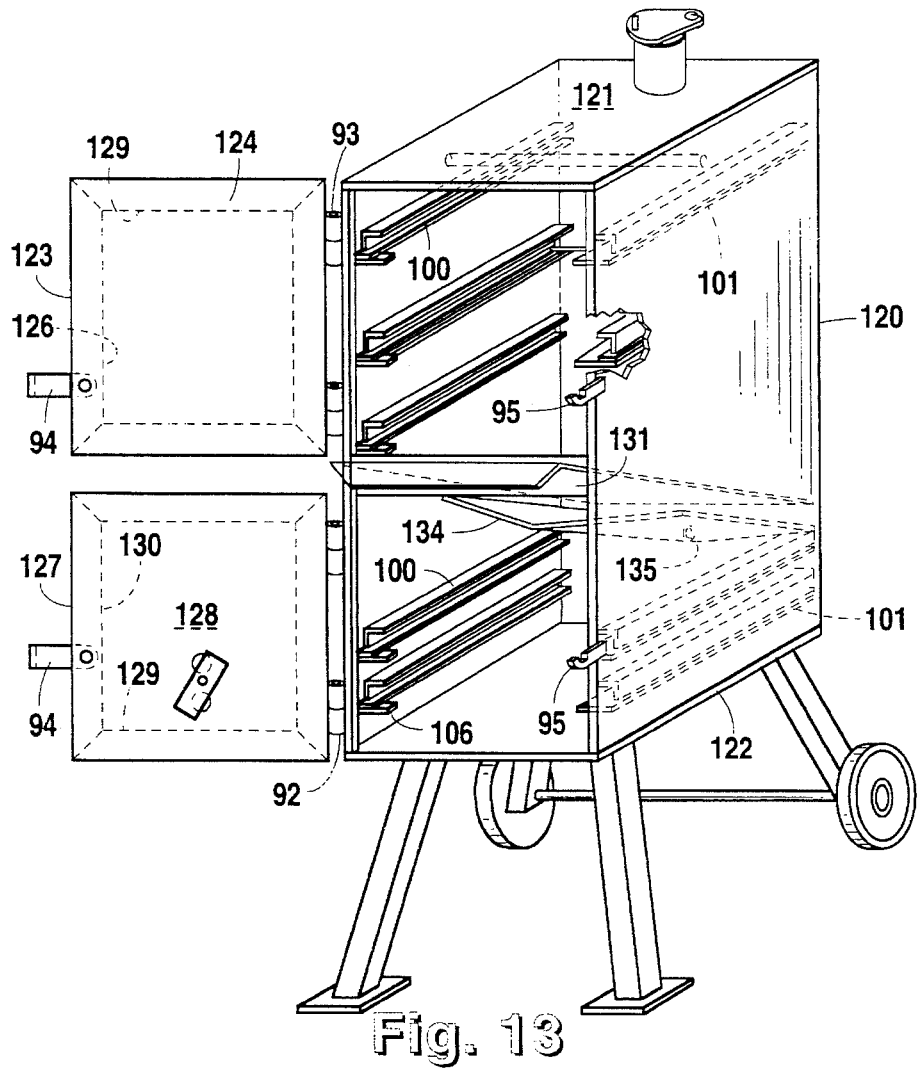
FIG. 13 is an isometric of the square or rectangular configuration of the third preferred embodiment.

As shown in the drawings, FIG. 13, a smoke cooking device in accordance with the present invention includes a vertical hollow main member 120 of square or rectangular cross section, made preferably of sheet metal. The main member 120 is hollow to allow an internal area for holding food, specifically meat while being cooked, utilizing smoke for flavoring.

The main member 120 is enclosed at the upper end by a flat plate member 121; and enclosed at the lower end by a flat plate member 122. The cooking compartment is enclosed by an upper door 123 consisting of a flat sheet panel member 124 with heavy gage formering members 125 and 126 around the periphery. Enclosing the fire box cooking compartment a lower door 127 consisting of a flat panel member 128 with heavy gage formers 129 and 130 around the periphery. A sheet metal support beam 131 is attached to the formed edges of the main member 120 and spans across providing a sill for the upper edge of the lower door 127.

A similar sheet metal support beam 132 is attached to the formed edges of the main member 120 and spans across providing a sill for the lower edge of the upper cooking compartment door 123.

Figure 15:
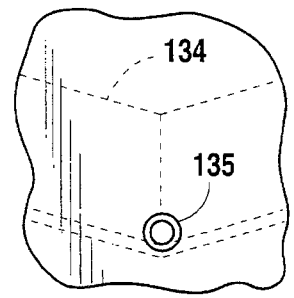
FIG. 15 is a fragmentary straight projection off the view of FIG. 14.

The internal area of the main member 120 is divided by an adjustable partition member 133 located at approximately the third span, of the main member 120, from the lower plate member 122. The partition member 133 is located at an angle by guide members 125, higher at the front and sloping to the rear. This inclined position is to divert the renderings from a free fall path into a secondary fixed partial partition member 134. The fixed partial partition member 134 further guides the renderings into a drain opening member 135 for dispensing. The fixed partition member 134 is not only inclined but the sides are also formed at an angle as shown in the drawings FIG. 15, in relation to the main member 120 side walls.

Figure 9:
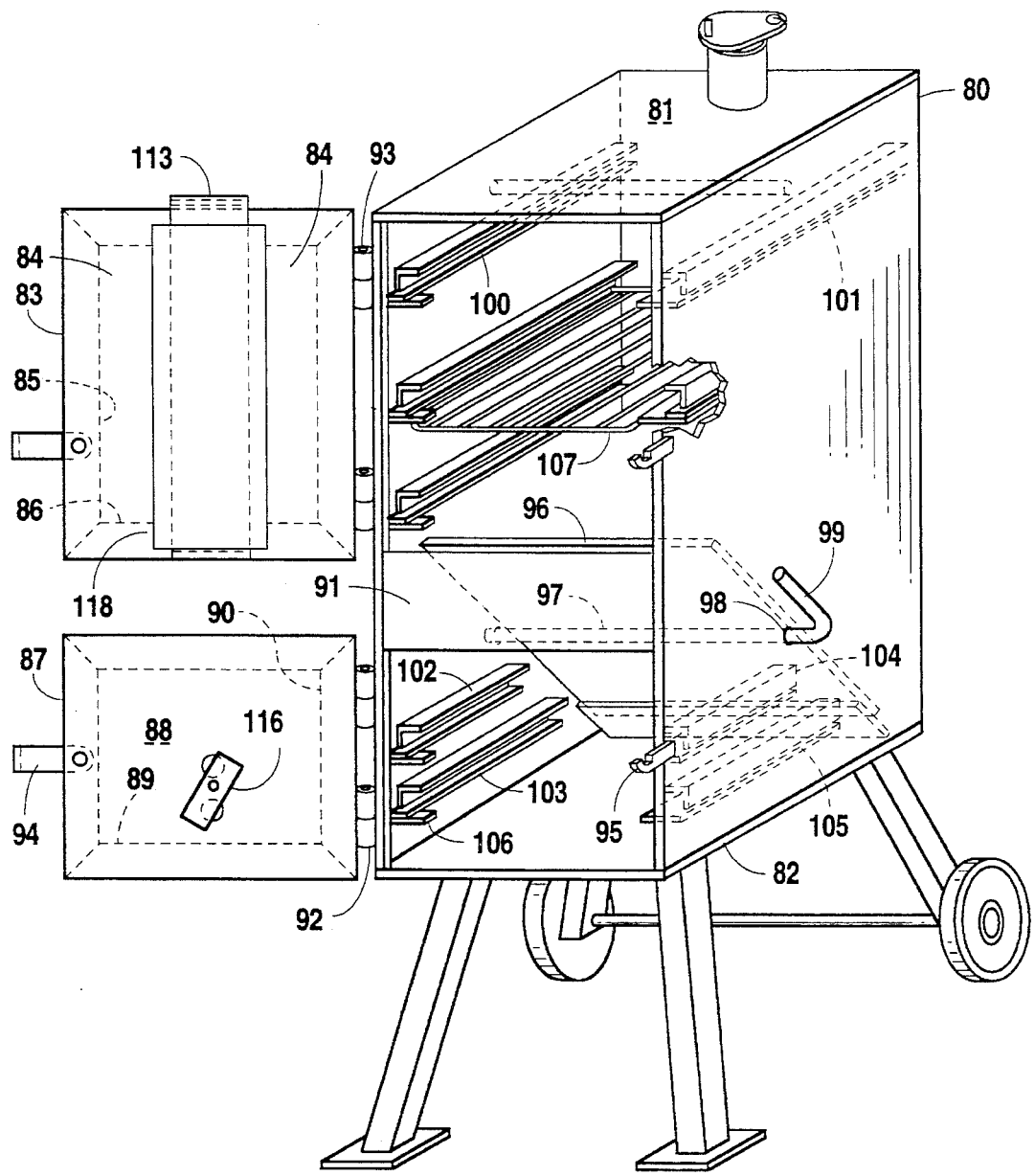
FIG. 9 is an isometric of the square or rectangular configuration of the second preferred embodiment.

As shown in the drawings parts of variations of the present invention are common between configurations as shown in the drawings in FIG. 9 and FIG. 13.

Specifically common parts are as follows: hinge pipe member 92 and hinge pin 93, pivot latch member 94 and notched receiving number 95, grill guide members 100 and 101, air intake member as shown in FIG. 12, rotating bar member 116 and "T" handle 117, further members pertaining to the grill shelves 107, are the same as shown in the drawings in FIG. 10.

Also the procedure of inserting and removing the grill shelve 107 is the same see sheet 13.

SUMMARY OF THE INVENTION

The principal object of the present invention is to provide a device for use in precise controlled sanitary smoke cooking of food, specifically meat.

It is also an object of the present invention to provide a device which is comparatively less expensive to construct relative to other cookers in a comparable utility class and price range.

Another object is to provide such a device which has the capability to precisely control the quantity of heat and smoke.

A further object is to provide a device which has an efficient system to eliminate rendered waste resulting from the cooking process.

The foregoing objects can be accomplished by providing a cooking device having a vertical main hollow member enclosed at the ends. Door or doors in the sidewall provide access for placing food in the cooking compartment and fueling the firebox compartment.

An adjustable partition separates the lower firebox compartment from the cooking compartment above. The manually adjustable partition is operator controlled from the exterior. The object of efficiently eliminating the rendered waste resulting from the cooking process is accomplished by the adjustable partition. The adjustable partition is always set at an incline or angle in relationship to the vertical axis of the main member. As the rendered waste is secreted from the product during the cooking process and free falls in a downward path it contacts the inclined surface of the adjustable partition and is diverted into a partitioned reservoir area then further accumulated in a dispensing container. This systematically eliminates reburning the rendered waste, producing a cleaner food.

A final object of the present invention is to provide a device with door mounted grill shelves. This allows the operator to stand clear of the heat and smoke while tending the food. When the doors are widely opened the food is rotated to a distance from the cooking compartment.

I claim:

1. A food cooking device for use in grilling or hanging especially meat, for smoke cooking comprising:

a) a housing means comprised of a top closure panel and a bottom closure panel placed in substantially horizontal parallel planes connected to a vertical sidewall, said sidewall having a given diameter, said top closure panel connected to a first edge of the sidewall, said bottom closure panel connected to a second edge of the sidewall at an opposite end of the first edge of the sidewall, said bottom closure panel providing means for support of solid fuel, said top closure panel providing means for containing heat within the interior of said housing, said housing having a first vertical side edge and a second vertical side edge;

b) at least one sidewall closure door adapted to swing on a substantially vertical axis between a closed position and an open position, said sidewall closure door defined in a closed position whereby said sidewall having a first vertical side edge is connected to said housing sidewall first vertical side edge and a second vertical side edge by means coupled to said housing sidewall second vertical edge, further said closure door sidewall having a given diameter being common with said housing sidewall forming a closed interior divided by a substantially imperforate and adjustable partition plate forming two chambers, an upper cooking chamber and a lower firebox chamber, said adjustable partition plate adapted to rotate about a substantially horizontal axis between a closed position and an open position, whereby said closed position substantially seals said firebox chamber from said cooking chamber above, said adjustable partition plate defining, jointly with said closure door interior sidewall and said housing interior sidewall, an open position permitting a selected quantity of hot air from said firebox chamber past said adjustable partition plate into said cooking chamber; and c) at least one grill attached within the interior of said cooking chamber substantially parallel to said top closure panel and located above said adjustable partition plate, said grill including spaced cross members adapted to pass renderings downwardly from an edible supported thereon.

2. The apparatus of claim 1 wherein said upper cooking chamber includes means to vary the quantity of heated air exhausted when said sidewall closure door is in a closed position.

3. The apparatus of claim 1 wherein said lower firebox chamber includes means to vary the quantity of ambient intake air.

4. The apparatus of claim 1 wherein said adjustable partition plate has an outer edge, said edge is defined, in a closed position, substantially contacting jointly, said sidewall closure door interior sidewall and said housing interior sidewall with said sidewall closure door in a closed position, said adjustable partition plate located between said firebox chamber and said cooking chamber, forming a substantially impervious partition substantially sealing said firebox chamber, thereby allowing substantially no hot air past said adjustable partition plate into said cooking chamber thereabove, said adjustable partition plate outer edge further defining a first upper planar surface; substantially parallel therewith and opposite thereof, a second lower planar surface interrupted by an attached rod laterally located near a geometric center line, said rod providing said adjustable partition plate support means depending with said housing sidewall, whereby a first end portion of said rod extends outside said adjustable partition plate outer edge protruding into and cooperating with a first index hole formed in said housing sidewall to form a first support means, said first index hole located near said housing first vertical side edge, said housing further including a second index hole formed through said housing sidewall and aligned on said housing sidewall center line diametrically opposed to said first index hole and providing a second support means for said rod with said adjustable partition plate attached, said second index hole including a horizontal lead-in notch substantially perpendicular to said vertical second edge of said housing sidewall, said lead-in notch comprised of a first lower edge and a second upper edge, allowing space therebetween to receive entry and further guide said rod with said adjustable partition plate attached into said second index hole, said rod having a second end portion, opposite of said rod first end portion, extends outside said adjustable partition plate outer edge, formed to provide rotating means and further permitting visible determination of the angular tilted position of said adjustable partition plate from exterior view.

5. The apparatus of claim 4 wherein said housing includes said adjustable partition plate having said impervious first upper flat surface providing means for eliminating rendered waste from said cooking chamber.

6. The apparatus of claim 1 wherein said housing interior diameter and length is dimensionally defined depending the capacity selected for appropriate cooking of an edible in an atmosphere of combustion product by arrangement means of hanging or supporting on said grill.

7. The apparatus of claim 1 wherein said housing includes a firebox solid fuel containment means whereby a ring having an outside diameter is supported on said lower closure panel, said ring is defined whereby the outside diameter fits inside said housing sidewall diameter, further said ring vertical sidewall height is defined depending the solid fuel capacity selected.

8. The apparatus of claim 1 wherein said housing includes means for a direct-flame cooking technique whereby said ring provides containment means for solid fuel supported thereon said upper surface of said adjustable partition plate, further forming a second level firebox for cooking an edible supported on said overlying grill thereabove.

9. A food cooking device for use in grilling or hanging, especially meat, for smoke cooking comprising:

a) a housing means comprised of a top closure panel and a bottom closure panel placed in substantially horizontal parallel planes connected to a vertical sidewall said sidewall having a given diameter, said top closure panel connected to a first edge of the sidewall said bottom closure panel connected to a second edge of the sidewall at an opposite end of the first edge of the sidewall, said bottom closure panel providing means for support of solid fuel, said top closure panel providing means for containing heat within the interior of said housing, said housing having a first vertical side edge and a second vertical side edge;

b) at least one sidewall closure door adapted to swing on a substantially vertical axis between a closed position and an open position, said sidewall closure door defined in a closed position whereby said sidewall having a first vertical side edge is connected to said housing sidewall first vertical side edge and a second vertical side edge by means coupled to said housing sidewall second vertical side edge, further said closure door sidewall having a given diameter being common with said housing sidewall forming a closed interior divided by a substantially imperforate and adjustable partition plate forming two chambers, an upper cooking chamber and a lower firebox chamber, said adjustable partition plate adapted to rotate about a substantially horizontal axis between a closed position and an open position, whereby said closed position substantially seals said firebox chamber from said cooking chamber above, said adjustable partition plate defining, jointly with said closure door interior sidewall and said housing interior sidewall, an open position permitting a selected quantity of hot air from said firebox chamber past said adjustable partition plate into said cooking chamber; and c) at least one grill attached within the interior of said cooking chamber substantially parallel to said top closure panel and located above said adjustable partition plate, said grill including spaced cross members adapted to pass renderings downwardly from an edible supported thereon, said vertical housing including said attached horizontal top closure panel: and d) a canopy, forming a warming compartment, is attached to said housing and mounted above said top closure panel, said canopy comprising a closure panel and a ring member, said closure panel sealing an upper end of the ring member, said ring member defined by having the same diameter as said housing sidewall diameter, said ring member further defined having vertical sidewall height for appropriate storing depending the capacity selected, said ring includes connecting means provided jointly with said housing, located on said ring rear sidewall near the juncture with said housing top closure panel, further said connecting means adapted for vertical movement, of said ring with said closure panel attached, about a horizontal axis between an open and closed position.

\* \* \* \* \*